United States Patent [19]

Pech

[11] 3,957,281
[45] May 18, 1976

[54] TENSIONING DEVICE CAPABLE OF DAMPED RETURN MOVEMENT AND RETENSIONING

[75] Inventor: Bernard Marcel Pech, Paris, France

[73] Assignee: Societe Nationale des Poudres et Explosifs, France

[22] Filed: Mar. 18, 1975

[21] Appl. No.: 559,430

[30] Foreign Application Priority Data
Apr. 23, 1974 France .............................. 74.13980

[52] U.S. Cl. .............................................. 280/744
[51] Int. Cl.² ......................................... B60R 21/10
[58] Field of Search ............. 280/150 SB; 180/82 C

[56] References Cited
UNITED STATES PATENTS

| 3,804,430 | 4/1974 | Fiala | 280/150 SB |
|---|---|---|---|
| 3,871,470 | 3/1975 | Schwanz | 280/150 SB |
| 3,871,683 | 3/1975 | Otani | 280/150 SB |
| 3,879,054 | 4/1975 | Lindblad | 280/150 SB |

Primary Examiner—Robert R. Song
Attorney, Agent, or Firm—Bucknam and Archer

[57] ABSTRACT

A tensioning device which also provides for damped return movement and subsequent retensioning, such as for use with a vehicle safety belt comprises a casing, a piston movable within the casing by high pressure gases issuing from a pyrotechnic charge, a rod attached to the piston and carrying an attachment buckle for the belt, and a piston jamming mechanism for preventing movement of the piston in one direction but allowing damped movement thereof in the opposite direction, the piston and/or any of the other additional pistons possibly included in the device, having a part slidable relative thereto with a compression spring located therebetween for urging the piston and associated part axially apart at the end of damping. The pistons and associated parts form concentric members, the springs being located between them and abutting against an inwardly directed shoulder on the piston and external shoulder on the parts.

8 Claims, 11 Drawing Figures

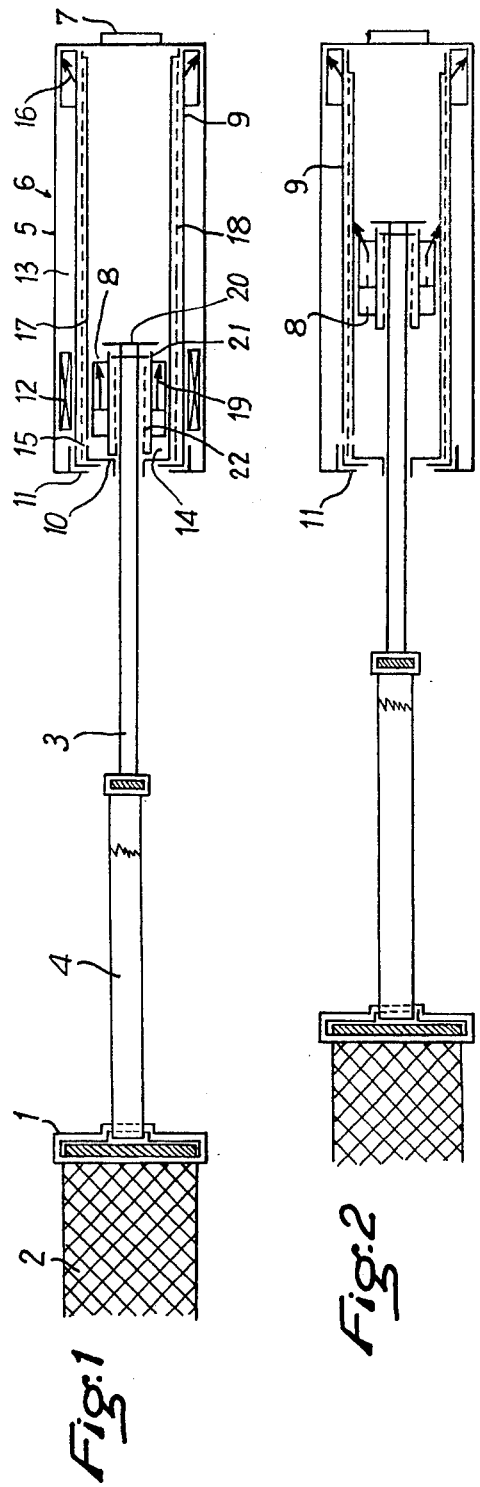
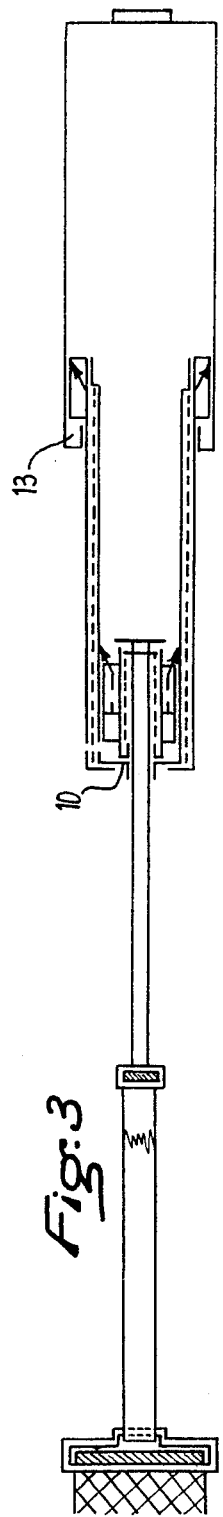
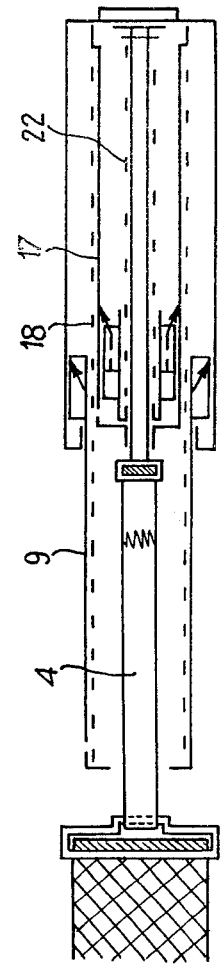

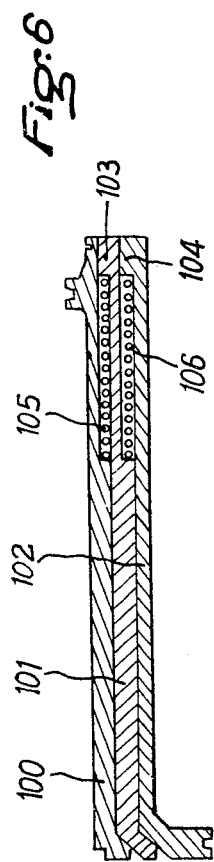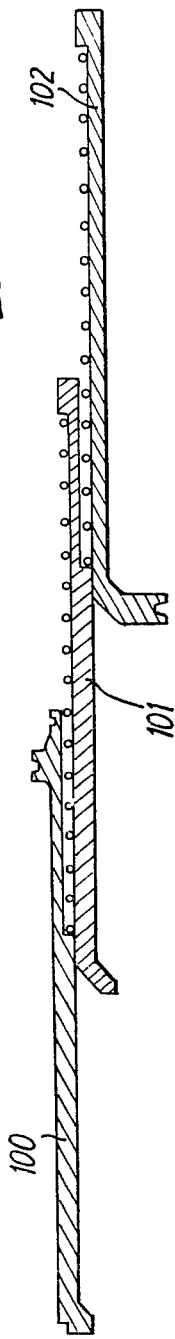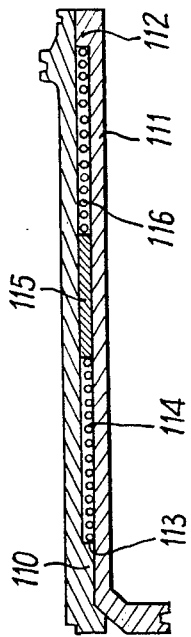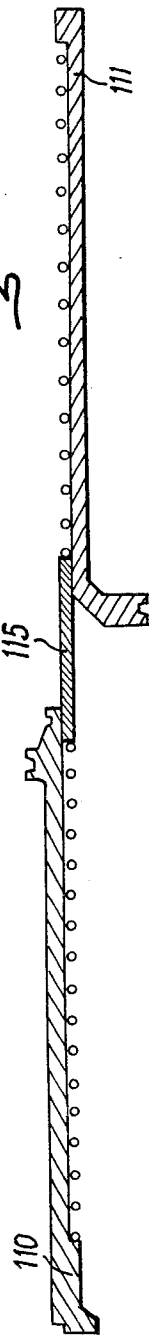

TENSIONING DEVICE CAPABLE OF DAMPED RETURN MOVEMENT AND RETENSIONING

This invention relates to linear mechanical tensioning devices which can be used, for example, as protection devices in conjunction with safety belts installed in vehicles such as motor cars, capable of travelling at high speeds.

Numerous protection devices are known for ensuring the safety of people travelling in vehicles, and seat belt tensioning devices such as those described in French Patent applications No. 73.45,838 and No. 73.45,840 provide damping comparable in efficiency to that provided by inflatable cushions or by safety belts combined with a damping device secured to the vehicle seat. With tensioning devices it is unnecessary to carry out any initial adjustment of the safety belt each time a different person occupies the seat, and the slack in the belt allows the person freedom of movement. Furthermore, these devices provide gradual and complete damping over a maximum length of travel, since the belt does not come into contact with the person until collision has occurred. The two successive functions of tensioning and then damping are effected by using, for example, the thermodynamic properties of high-pressure gases liberated in the device and this makes it possible to produce a single fixture at a low production cost.

At the end of the damping process, however, the tensioning devices are extended and various pistons included in their constructions cannot move back again to take up the slack in the belt as they are each blocked by jamming mechanisms. This blocking of the pistons against return movement is essential since, without it, the person to be protected would be catapulted on to his seat by a force close to the energy absorbed by the device. On the other hand, the non-return of the safety belt to a position in which it holds the person is a great disadvantage, since the person is no longer held on his seat and is not protected against secondary impacts of low intensity, such as due to a car rolling over after a violent impact.

In accordance with the present invention there is provided a tensioning device such as for use in tensioning a vehicle safety belt, comprising a casing, one or more pistons including an actuating piston axially movable in a cylinder defined within the casing and secured to an axially extending rod having means for attachment to an element to be tensioned, means for supplying gas at high pressure to an expansion chamber defined between the actuating piston and a front end wall of the cylinder, whereby in use the said gases cause the actuating piston to travel in a first direction along the cylinder and exert a tensioning force on an element attached to the rod, piston stopping means actuable in response to the tensioning force reaching a predetermined value to prevent movement of the actuating piston relative to the cylinder in said first direction, but allow movement of the actuating piston relative to the cylinder in the opposite direction for damping, and means for exerting a tension force on the element attached to the rod at the end of the damping including a part concentric with one piston and axially slidable relative thereto, and a resilient element acting between the concentric part and said one piston for moving the part in said first direction relative to the piston at the end of the damping when any external forces exerted on the rod opposing retraction thereof have been substantially reduced.

With such a device it is possible to maintain tension at the end of the damping in such a way that a person to be protected is held on his seat by a safety belt attached to the device with an applied force very much lower than that generated by the movement of the various pistons of the device. Moreover, the resilient elements of the device, which ensure that the person to be protected is brought back into contact with his seat, have a strength which allows a low degree of damping in the case of a secondary impact, should this occur, and which permits quick release of the person to be protected.

In one embodiment, an outer piston is located between the centrally located actuating piston and the casing, the outer piston being fitted with a component which prevents any return movement of this piston relative to the casing and towards its initial position.

The resilient component which pushes the concentric part back may be a helicoidal spring.

The device may have more than one piston with each piston having a concentric sliding part associated therewith to ensure that tension forces are exerted by the device at the end of the damping.

In one embodiment, a concentric tubular part is slidable inside the outer piston which is provided with an internal stop adjacent the front end thereof and a bore with a rear end portion of increased diameter which extends over a major part of the piston length, the said tubular part having an external shoulder adjacent its rear end whereby an annular cavity is defined between the tubular part and piston, and a resilient element is disposed in the cavity and acts between the stop of the piston and shoulder of the part for moving the piston and tubular part apart at the end of damping.

The said one piston may be the actuating piston and the concentric sliding part the axial rod. The rod has an enlarged rear end defining an annular radial shoulder against which is supported a frangible member for retaining the resilient element, which is inserted between the axial rod and the piston, in its initial state of compression, the resilient element being supported at its forward end by a front part of the piston.

In an alternative construction an outer piston has two parts concentric therewith and slidable relative thereto, the parts being slidable relative to each other, and two resilient elements are provided for moving the parts relative to the piston and to each other at the end of the damping.

The outer piston may have a bore with a rear end portion of increased diameter which extends over a major part of the length, a first concentric part received in the bore having an external shoulder adjacent its rear end to define an annular chamber between the piston and first part in which a front resilient element, the second part in the form of a concentric sliding ring, and a rear resilient element are received.

Some embodiments of the invention, for use with vehicle seat belts, are described below, by way of example, with reference to the accompanying drawings, in which:

FIG. 1 is a diagrammatic cross-section of a device in its initial condition;

FIG. 2 is a diagrammatic cross-section of the device of FIG. 1, shown in the course of a first damping phase;

FIG. 3 is a diagrammatic cross-section of the device of FIG. 1, shown at the end of a second damping phase;

FIG. 4 is a diagrammatic cross-section of the device of FIG. 1, shown in its final position;

FIG. 6 is a partial cross-section of an alternative construction;

FIG. 7 is a partial cross-section showing the piston of FIG. 6 in its final position;

FIG. 8 is a partial cross-section of another construction;

FIG. 9 is a partial cross-section showing the piston of FIG. 8 in its final position;

Figure 5:
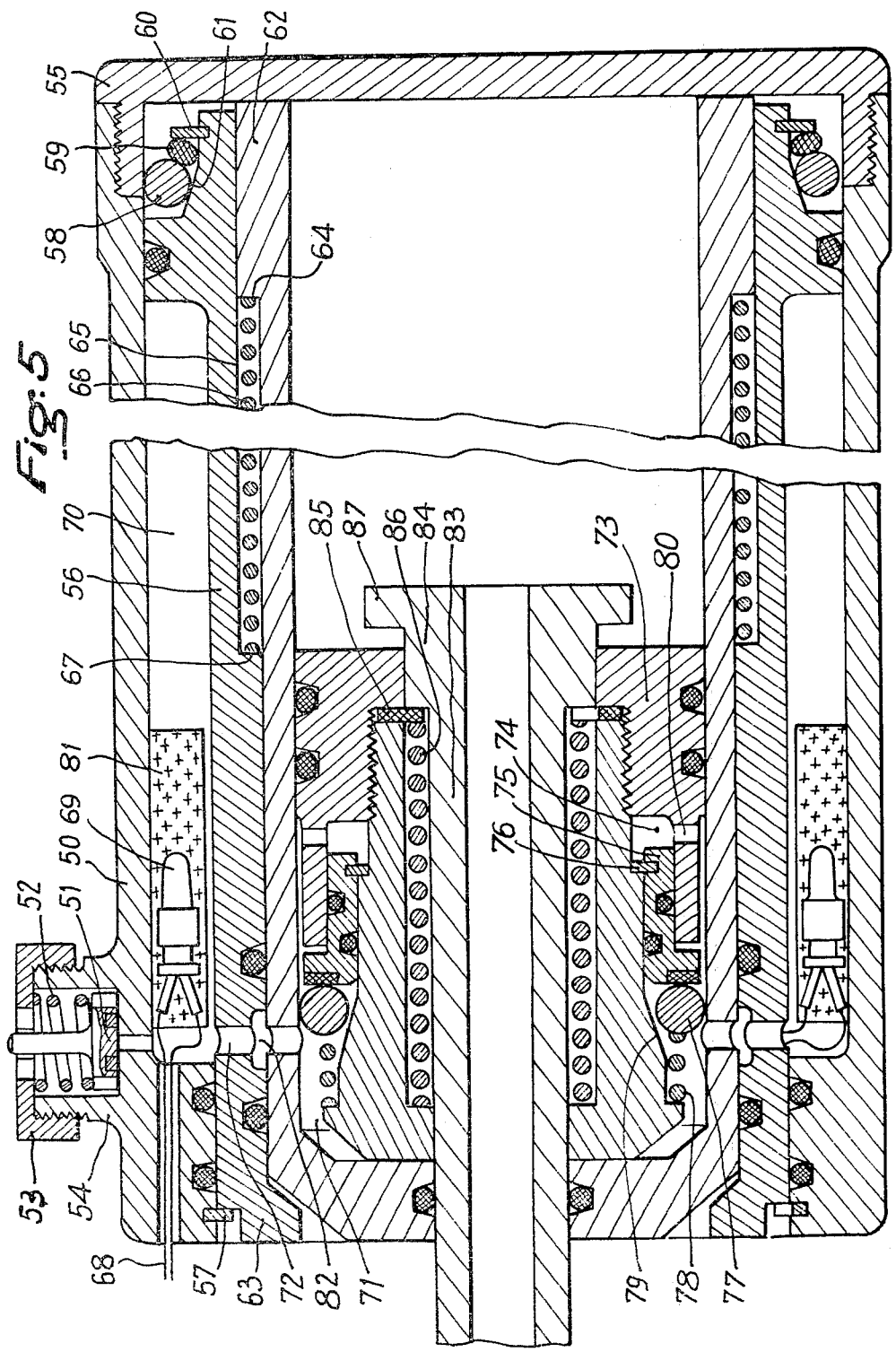
FIG. 5 is a detailed longitudinal cross-section of the body of a tensioning device in accordance with the invention.

The linear mechanical tensioning device shown in FIGS. 1, 2, 3 and 4 has a buckle 1 for attaching a safety belt 2 and connected to an axial rod 3 by a narrow strap 4. An outer casing 5 of a body 6 of the device is, in use, firmly fixed to the chassis of a vehicle by an attachment member 7. A central, actuating piston 8 is firmly fixed to the axial rod and an outer piston 9 is located between the central piston and the outer casing. In an initial position, when the device is not in use, the central piston is in contact with a front end wall 10 of a tubular part 17 concentric with and located between the inner and outer pistons, and the outer piston 9 is held telescoped inside the casing by a frangible stop 11. An explosive charge 12 for generating high pressure gases is located in a damping chamber 13 defined between the outer piston and casing and which communicates with an expansion chamber 14 defined between the inner piston and the front end wall of tubular part 17 through openings 15. The outer piston is fitted with a component 16 for preventing movement of the piston relative to the casing in one direction of travel of the piston. The component is permanently in a working condition and arranged to prevent backwards movement of the piston (i.e., to the right as seen in FIG. 1) after the piston has travelled forwards. The device also has a component which maintains tension at the end of the damping process consisting of the concentric tubular sliding part 17 which is located inside the outer piston, and of a pre-stressed resilient element 18 for pushing apart the telescoped piston 9 and part 17. The central piston has a component 19 for preventing relative movement between the central piston and tubular part 17 in one direction of travel of the piston. A jamming mechanism of this component is in a non-jamming condition in the initial position of the piston 8, as shown in FIG. 1, and during the initial displacement of the central piston backwards into the body, which occurs when the pyrotechnic charge 12 is fired. The jamming mechanism is actuated, when a predetermined maximum force is applied to the safety belt, to stop the backward displacement of the central piston and only allow it to travel forwards and return to its initial position relative to part 17. The central piston also has a device for maintaining tension at the end of the damping process and this consists of an enlarged rear end of the axial rod defining an annular, radial shoulder 20 which axially supports a frangible stop 21. A pre-stressed resilient element 22 is inserted between the axial rod and a body portion of the central piston and is held in its initial, axially compressed state by the stop 21. A pressure-limiting device (not shown) is provided and may consist of an external valve or of a residual compression chamber of the casing.

In the initial position (FIG. 1) the tensioning device has a length approximately equal to the length of the outer casing and the axial rod, the component 19 is in a non-jamming condition and the central piston can move freely, whilst the outer piston is held telescoped within the casing by a frangible stop 11, for example, in the form of an elastic ring with lugs. When the person to be protected puts on his safety belt, no adjustment is necessary and the belt will not be in close contact with the person, thus leaving him substantially free to move. When a collision occurs, an electric signal generated by an impact detector fires the pyrotechnic charge 12 which liberates a large volume of gas within a very short period of time. The high pressure gases generated by the pyrotechnic charge raise the pressure in the expansion chamber and propel central piston 8 backwards. This backward movement of the piston ruptures the frangible stop 21 which is sheared off the rod 3 by the shoulder 20. Since the outer casing is firmly anchored to the chassis of the vehicle, the rod which is connected to the central piston is retracted until the safety belt attached to its free end comes into contact with the person to be protected. This will occur before the central piston reaches the end of its backward path, the exact position of the central piston when contact between the passenger and belt occurs being determined by the slack initially present in the safety belt. The person thrown violently forwards by his own inertia as a result of the collision exerts a high resisting force on the central piston opposing its backward movement, and the travel of the latter is slowed down and then eventually stopped when this resisting force reaches a predetermined maximum value. At the maximum force the component 19 is triggered into operation to prevent further backward movement of the piston while allowing the central piston to travel forwards in order to effect a first phase of damping (FIG. 2). A second phase of damping (FIG. 3) is initiated when the central piston has returned to its initial position in contact with the front end 10 of the concentric tubular part 17 and when the resisting force exerted by the person wearing the belt reaches a magnitude sufficient to rupture the elastic ring with lugs 11, and free the outer piston for forward movement relative to the casing. Forward displacement of the outer piston compresses gases present in the damping chamber 13, the rise in pressure of these gases being limited either by a calibrated valve or by a residual compression chamber. When the second damping phase is complete (FIG. 4) and a high resisting force is no longer exerted on the rod 3, the resilient component 22 of the central piston expands and pushes the axial rod backwards relative to the piston, and the central piston is itself pushed back by the concentric tubular part 17 which is forced backwards relative to the outer piston by the resilient element 18. This relative movement between the component parts of the device is effective to bring the device back to a minimum effective length, the narrow strap 4 entering the extended outer piston 9 and the two resilient components acting to maintain tension in the belt, at the end of the damping process, to hold the person wearing the belt in contact with the seat.

The body of a tensioning device shown in FIG. 5 comprises an outer casing 50 equipped with a pressure-limiting valve 51 which is held in the closed position by a calibrated spring 52 supported by a cap 53 screwed to a boss 54 of the casing. The outer casing also has a threaded rear end plate 55. An outer piston 56 is slidable in the casing and is normally held telescoped within the casing by an elastic washer with lugs 57 which is received in a groove on the inside of the outer casing. The outer piston is fitted, at its rear end, with a jamming mechanism which consists of a collection of balls 58 supported by an elastic ring 59 in turn supported by a ring 60. The balls are in contact with the inner surface of the outer casing and with a conical bearing surface 61 of the outer piston. A concentric tubular sliding part 62 is located within the outer piston and is prevented from moving axially relative to the piston by the end plate 55 at one end, and at the other end by an inwardly directed flange 63 near the front end of the outer piston. The tubular part is formed with an external radial shoulder 64 adjacent its rear end which is located in a bore portion 65 of the outer piston, which bore portion extends over a major portion of the piston length. A helical compression spring 66 is located in this bore portion and is supported axially at its opposite ends, on the one hand, by an internal shoulder of the piston which defines an end wall 67 of bore portion 65, and by the external shoulder 64 of the tubular part 62 on the other hand. An annular pyrotechnic charge is connected to the outside by two firing leads 68 and consists of two quick-acting igniters 69 and of a main charge 81, produced from a homogeneous double-base powder composition. This annular charge is located in the damping chamber 70 and the combustion gases are conducted into the expansion chamber 71 via four passageways 72 which pass through the outer piston 56 and the concentric tubular part 62, a distributor groove 82 being machined in the inner surface of the outer piston. Inside the concentric tubular part 62 is located the central piston which carries a tubular extension 73 defining an annular control chamber 74 for a jamming mechanism. The jamming mechanism consists of an auxiliary annular piston 75 held in a non-operating position by a ring with lugs 76. A collection of balls 77 is held in contact with the auxiliary piston by means of a spring 78, and are only jammed between the inner surface of the concentric tubular part and a conical bearing surface 79 of the central piston when the ring with lugs 76 is sheared off under the action of the pressure prevailing in the control chamber 74 which communicates with the expansion chamber 71 via orifices 80. The central piston includes a component for maintaining tension at the end of the damping process. The axial rod 83 has its front part connected to the safety belt and has on its rear end part a radial enlarged portion which is slidable in the bore of the tubular extension 73 of the piston. The enlarged end defines an annular, radial shoulder 84 for supporting and then shearing off the retaining lugs of the ring 85 to release compressed spring 86 which is axially supported at its forward end by an inner shoulder 87 of the piston bore.

The device shown in FIG. 5 possesses only one outer piston, and, in the case where effective damping of the person to be protected must be carried out, it is of advantage to use a device with two concentric outer pistons, such as has been disclosed in British Patent Applications Nos. 53859/74 and 54642/74. These two outer pistons can be of a design identical to that of the outer piston of FIG. 5, but it is preferable that only the inner of the two outer pistons should possess a component effective to maintain tension in the seat belt at the end of the damping process.

In the construction illustrated in compressed and extended positions in FIGS. 6 and 7, respectively, an outer piston 100 carries two concentric tubular sliding parts 101, 102 each having adjacent its rear end a shoulder 103, 104 against which a helical compression spring 105, 106, located in an annular recess surrounding each of the concentric parts, is supported. With this construction the central piston can be rigidly attached to the rod 3.

FIGS. 8 and 9 show an alternative construction, in the initial compressed and final extended positions respectively in which an outer piston 110 has a bore, with a portion of increased diameter towards the rear end, and extending over a major portion of the piston length. A main concentric part 111 is provided at its rear end with an external annular shoulder 112 and defines with the piston an annular chamber in which a front spring 114, a sliding ring 115 and a rear spring 116 identical to the front spring are located. The front spring bears axially against an internal shoulder on the piston and the rear spring against the shoulder on the main tubular part.

Figure 10:
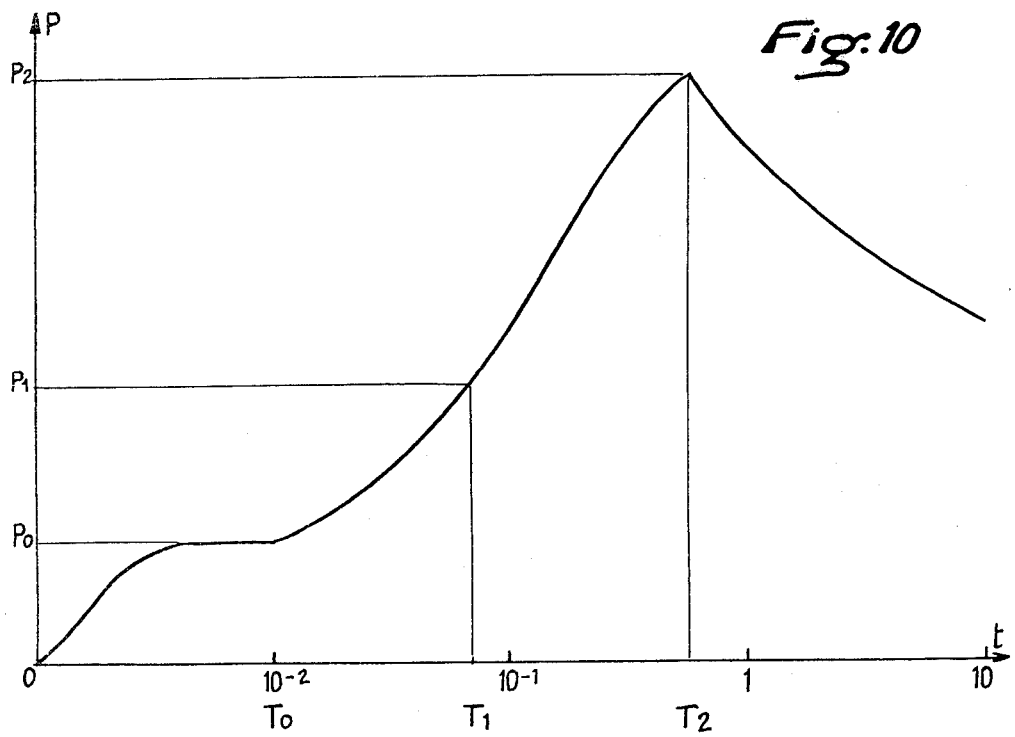
FIG. 10 is a diagram showing the change in pressure as a function of time.
Figure 11:
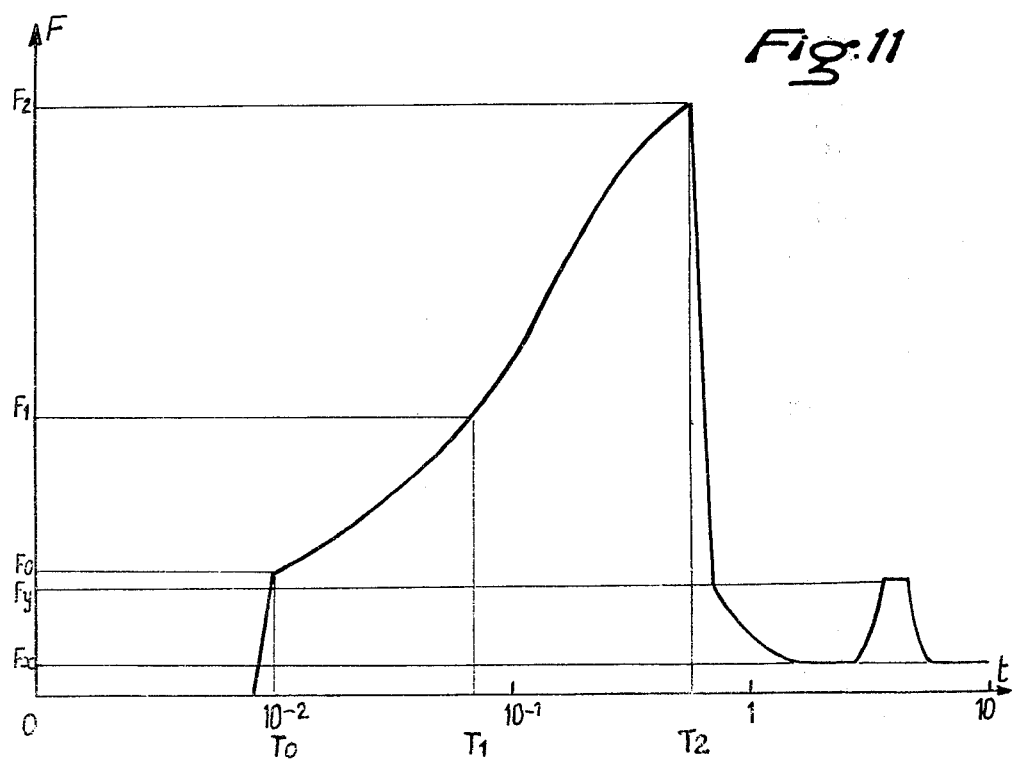
FIG. 11 is a diagram showing the change in force as a function of time.

FIGS. 10 and 11 respectively show the gas pressure and the resisting force exerted on the belt as a function of time, plotted on a logarithmic abscissa scale. The origin 0 corresponds to the moment of firing the ignition powder, time To corresponds to the instant at which the jamming mechanism of the central piston is actuated, time T1 corresponds to the instant at which the central piston has returned to its initial position after the first damping phase has been completed, and time T2 corresponds to the end of the second damping phase of the person to be protected. On the ordinates, the indices of the particular values of the pressures Pn and forces Fn indicated correspond to the indices of the time instants considered. FIG. 11 shows that after the damping is complete, the extension of the springs of the components which maintain tension ensures, on the one hand, that the person in held on his seat by a weak force Fx which permits easy release, whilst it ensures, on the other hand, in the case of any secondary impacts of the vehicle, a limited damping Fy which returns at the end of each of these impacts to the relatively weak force Fx which holds the protected person on his seat.

I claim:

1. A tensioning device for use in tensioning an element, such as a vehicle safety belt, comprising a casing, a cylinder having front and rear ends defined within said casing, piston means comprising at least one first piston axially movable within said cylinder, a rod secured to said one piston and having means for attaching said element to be tensioned, an expansion chamber defined between said one piston and said front end of said cylinder, means for supplying gas at high pressure to said expansion chamber to move said one piston in a first direction along said cylinder to exert a tensioning force on the element attached to said rod, piston stopping means actuable in response to said tensioning force reaching a predetermined value to prevent movement of said one piston relative to said cylinder in said first direction but allow movement of said one piston relative to said cylinder in the opposite direction for damping, and means for exerting a tension force on the element attached to said rod at the end of the damping comprising a member which is a part of said cylinder concentric with said piston means and axially slidable relative thereto, and resilient means located between said concentric part and said piston means, said resilient means urging said piston means axially apart from said concentric part, for moving said part in said first direction relative to said piston means, at the end of damping when any external tensioning forces exerted on said rod have been substantially reduced.

2. A tensioning device as claimed in claim 1 wherein said piston means comprises a plurality of pistons and each of said pistons has member concentric therewith and slidable relative thereto for exerting a tension force on the element attached to said rod, at the end of said damping.

3. A tensioning device as claimed in claim 1 wherein said member for exerting a tension force on the element attached to said rod is said rod which is concentric with and slidable relative to said one piston and has a rear end enlarged to define an annular radial shoulder on said rod, a frangible member is supported by said shoulder, said resilient element is inserted between said rod and said one piston which has an abutment, and said resilient member has an initial state in which it is compressed and opposed front and rear ends which, in the initial state of said element, are supported by said piston abutment and said frangible member, respectively.

4. A tensioning device as claimed in claim 1 wherein said piston means includes an outer piston located between said one piston and said casing for axial movement relative to said casing, and said outer piston has means for preventing movement of said outer piston relative to said casing in one axial direction of movement of said outer piston relative to said casing, which said direction corresponds to return movement of said outer piston to an initial position relative to said casing.

5. A tensioning device as claimed in claim 4 wherein said outer piston has a bore with opposed front and rear ends, a tubular member is concentric with and slidable in said outer piston bore, said bore has an inwardly directed stop adjacent the front end thereof, said tubular member has a rear end and an annular, radial shoulder adjacent said rear end, an annular cavity is defined between said tubular member and said outer piston, and a resilient element is disposed in said cavity, said element acting between said stop and said shoulder for moving said outer piston and said tubular member axially apart at the end of said damping.

6. A tensioning device as claimed in claim 3 wherein two members are concentric with and slidable relative to said outer piston, said members being axially slidable relative to each other, and two resilient elements are provided for moving said members relative to each other and to said outer piston at the end of the damping, to exert a tension force on the element attached to said rod.

7. A tensioning device as claimed in claim 6 wherein said outer piston has a bore with opposed front and rear ends, and a rear end portion of larger diameter, which portion constitutes a major portion of said bore, a first one of said members is received in said piston bore and has a rear end with an external shoulder thereon, the other of said members is a sliding ring, said outer piston and said part define an annular chamber therebetween, and a front resilient element, said sliding ring and a rear resilient element are successively located in said chamber.

8. A tensioning device according to claim 1 wherein said resilient means is a helicoidal spring.

* * * * *